United States Patent
Medoro et al.

(10) Patent No.: US 11,921,028 B2
(45) Date of Patent: Mar. 5, 2024

(54) METHOD AND DEVICE FOR OPTICAL ANALYSIS OF PARTICLES AT LOW TEMPERATURES

(71) Applicant: Menarini Silicon Biosystems S.p.A., Castel Maggiore (IT)

(72) Inventors: Gianni Medoro, Casalecchio di Reno (IT); Alex Calanca, Mirandola (IT); Nicolò Manaresi, Bologna (IT)

(73) Assignee: Menarini Silicon Biosystems S.p.A., Castel Maggiore (IT)

( * ) Notice: Subject to any disclaimer, the term of this patent is extended or adjusted under 35 U.S.C. 154(b) by 220 days.

(21) Appl. No.: 17/247,034

(22) Filed: Nov. 24, 2020

(65) Prior Publication Data
US 2021/0080374 A1    Mar. 18, 2021

Related U.S. Application Data

(62) Division of application No. 14/353,303, filed as application No. PCT/IB2012/055981 on Oct. 29, 2012, now abandoned.

(30) Foreign Application Priority Data

Oct. 28, 2011 (IT) .......................... TO2011A000990

(51) Int. Cl.
*G01N 15/14* (2006.01)
*B01L 3/00* (2006.01)
*B01L 7/00* (2006.01)

(52) U.S. Cl.
CPC .... *G01N 15/1425* (2013.01); *B01L 3/502715* (2013.01); *B01L 3/502761* (2013.01);
(Continued)

(58) Field of Classification Search
None
See application file for complete search history.

(56) References Cited

U.S. PATENT DOCUMENTS 4,652,127 A   3/1987 Ekholm et al.
4,682,007 A * 7/1987 Hollander .............. A42B 3/245
                                              219/203
(Continued)

FOREIGN PATENT DOCUMENTS

DE        3931851 A1    4/1991
DE       19500660 A1    6/1996
(Continued)

OTHER PUBLICATIONS

Altomare et al., Levitation and movement of human tumor cells using a printed circuit board device based on software-controlled dielectrophoresis, Biotechnol. Bioeng., 82(4):474-9 (2003).
(Continued)

*Primary Examiner* — Xiaoyun R Xu
(74) *Attorney, Agent, or Firm* — MARSHALL, GERSTEIN & BORUN LLP (57) ABSTRACT

Method and device (1b) for performing the optical analysis of particles (2) contained in suspension in a fluid (3) arranged inside a microfluidic device (4) which maintains it at a temperature significantly lower than the ambient temperature; the formation of humidity on the outer surface (8) of the cover of the microfluidic device is avoided by applying a thermal flow (P) which determines an increase in the temperature of the outer surface (8) of the cover to above the condensation temperature (Td), or reduction in the ambient temperature (and/or humidity) in the vicinity of the cover (8), so as to bring the condensation temperature (Td) (dew point) to below the temperature of the surface (8) of the cover determined by the internal operating temperature.

8 Claims, 5 Drawing Sheets

(52) U.S. Cl.
CPC ......... *B01L 7/00* (2013.01); *B01L 2200/0668* (2013.01); *B01L 2300/046* (2013.01); *B01L 2300/0645* (2013.01); *B01L 2300/10* (2013.01); *B01L 2300/1827* (2013.01); *B01L 2300/1894* (2013.01); *G01N 15/1456* (2013.01); *G01N 15/1484* (2013.01)

(56) References Cited

U.S. PATENT DOCUMENTS

| | | |
|---|---|---|
| 4,956,298 A | 9/1990 | Diekmann |
| 4,990,253 A | 2/1991 | Vcelka |
| 5,252,493 A | 10/1993 | Fujiwara et al. |
| 5,279,493 A | 1/1994 | Halder |
| 5,556,598 A | 9/1996 | Raybuck et al. |
| 5,833,860 A | 11/1998 | Kopaciewicz et al. |
| 5,888,370 A | 3/1999 | Becker et al. |
| 5,888,730 A | 3/1999 | Gray et al. |
| 5,922,591 A | 7/1999 | Anderson et al. |
| 5,942,443 A | 8/1999 | Parce et al. |
| 5,945,281 A | 8/1999 | Prabhu |
| 6,149,489 A | 11/2000 | Johnson |
| 6,149,789 A | 11/2000 | Benecke et al. |
| 6,203,683 B1 | 3/2001 | Austin et al. |
| 6,264,815 B1 | 7/2001 | Pethig et al. |
| 6,294,063 B1 | 9/2001 | Becker et al. |
| 6,440,725 B1 | 8/2002 | Pourahmadi et al. |
| 6,824,664 B1 | 11/2004 | Austin et al. |
| 6,830,729 B1 | 12/2004 | Holl et al. |
| 6,875,329 B2 | 4/2005 | Washizu et al. |
| 6,888,721 B1 | 5/2005 | Moghaddam et al. |
| 6,911,132 B2 | 6/2005 | Pamula et al. |
| 6,977,033 B2 | 12/2005 | Becker et al. |
| 7,147,763 B2 | 12/2006 | Elrod et al. |
| 7,250,933 B2 | 7/2007 | De et al. |
| 7,307,328 B2 | 12/2007 | Meyer et al. |
| 7,488,406 B2 | 2/2009 | Hughes et al. |
| 7,641,779 B2 | 1/2010 | Becker et al. |
| 8,216,513 B2 | 7/2012 | Becker et al. |
| 8,349,160 B2 | 1/2013 | Medoro et al. |
| 8,388,823 B2 | 3/2013 | Manaresi et al. |
| 8,641,880 B2 | 2/2014 | Medoro et al. |
| 8,679,856 B2 | 3/2014 | Manaresi |
| 8,685,217 B2 | 4/2014 | Manaresi et al. |
| 9,310,287 B2 | 4/2016 | Medoro et al. |
| 2001/0047941 A1 | 12/2001 | Washizu et al. |
| 2002/0031838 A1 | 3/2002 | Meinhart et al. |
| 2002/0036139 A1 | 3/2002 | Becker et al. |
| 2002/0070114 A1 | 6/2002 | Miles |
| 2002/0125138 A1 | 9/2002 | Medoro |
| 2002/0132316 A1 | 9/2002 | Wang et al. |
| 2002/0172987 A1 | 11/2002 | Terstappen et al. |
| 2002/0195342 A1 | 12/2002 | Lee et al. |
| 2003/0038772 A1 | 2/2003 | De et al. |
| 2003/0044832 A1 | 3/2003 | Blankenstein |
| 2003/0047456 A1 | 3/2003 | Medoro |
| 2003/0069413 A1 | 4/2003 | Pai et al. |
| 2003/0073110 A1 | 4/2003 | Aritomi et al. |
| 2003/0098271 A1 | 5/2003 | Somack et al. |
| 2003/0164295 A1 | 9/2003 | Sterling |
| 2004/0011652 A1 | 1/2004 | Bressler |
| 2004/0055891 A1 | 3/2004 | Pamula et al. |
| 2004/0058450 A1 | 3/2004 | Pamula et al. |
| 2004/0063196 A1 | 4/2004 | Muller et al. |
| 2004/0086427 A1 | 5/2004 | Childers et al. |
| 2004/0149546 A1 | 8/2004 | Henson et al. |
| 2004/0151629 A1 | 8/2004 | Pease et al. |
| 2004/0159546 A1 | 8/2004 | Zhang et al. |
| 2004/0191789 A1 | 9/2004 | Manaresi et al. |
| 2004/0209354 A1 | 10/2004 | Mathies et al. |
| 2004/0229210 A1 | 11/2004 | Sabry et al. |
| 2005/0009101 A1 | 1/2005 | Blackburn |
| 2005/0014146 A1 | 1/2005 | Manaresi et al. |
| 2005/0112541 A1 | 5/2005 | Durack et al. |
| 2005/0153430 A1 | 7/2005 | Ohtaka |
| 2005/0214736 A1 | 9/2005 | Childers et al. |
| 2006/0029923 A1 | 2/2006 | Togawa et al. |
| 2006/0037903 A1 | 2/2006 | Smith et al. |
| 2006/0051775 A1 | 3/2006 | Bianchi |
| 2006/0057738 A1 | 3/2006 | Hall |
| 2006/0072804 A1 | 4/2006 | Watson et al. |
| 2006/0086309 A1 | 4/2006 | Manger et al. |
| 2006/0139638 A1 | 6/2006 | Muller et al. |
| 2006/0177815 A1 | 8/2006 | Soh et al. |
| 2006/0223178 A1 | 10/2006 | Barber et al. |
| 2006/0228749 A1 | 10/2006 | Wang et al. |
| 2006/0290745 A1 | 12/2006 | Feng et al. |
| 2007/0015289 A1 | 1/2007 | Kao et al. |
| 2007/0026413 A1 | 2/2007 | Toner et al. |
| 2007/0026415 A1 | 2/2007 | Fuchs et al. |
| 2007/0051412 A1 | 3/2007 | Heath et al. |
| 2007/0059683 A1 | 3/2007 | Barber et al. |
| 2007/0152898 A1 | 7/2007 | Mizuno et al. |
| 2007/0172903 A1 | 7/2007 | Toner et al. |
| 2007/0190522 A1 | 8/2007 | Somack et al. |
| 2007/0195324 A1 | 8/2007 | Adams et al. |
| 2007/0250301 A1 | 10/2007 | Vaisberg et al. |
| 2008/0057572 A1 | 3/2008 | Petersen et al. |
| 2008/0058991 A1 | 3/2008 | Lee et al. |
| 2008/0246489 A1 | 10/2008 | Coster et al. |
| 2008/0264068 A1 | 10/2008 | Nakasuka et al. |
| 2009/0205963 A1 | 8/2009 | Medoro et al. |
| 2009/0218221 A1 | 9/2009 | Medoro et al. |
| 2009/0218223 A1* | 9/2009 | Manaresi ............ G01N 27/447 204/600 |
| 2009/0288963 A1 | 11/2009 | Guerrieri et al. |
| 2010/0035292 A1 | 2/2010 | Levhenko et al. |
| 2010/0043575 A1 | 2/2010 | Tajima |
| 2010/0248285 A1 | 9/2010 | Manaresi |
| 2010/0331205 A1 | 12/2010 | Medoro |
| 2011/0003380 A1 | 1/2011 | Miltenyi et al. |
| 2011/0183433 A1 | 7/2011 | Motadel et al. |
| 2011/0193006 A1 | 8/2011 | Simone et al. |
| 2012/0071335 A1 | 3/2012 | Manaresi et al. |
| 2012/0091001 A1 | 4/2012 | Manaresi et al. |
| 2012/0184010 A1 | 7/2012 | Medoro et al. |
| 2013/0118903 A1 | 5/2013 | Becker et al. |
| 2014/0131207 A1 | 5/2014 | Medoro et al. |
| 2014/0315236 A1 | 10/2014 | Manaresi |
| 2015/0126396 A1 | 5/2015 | Manaresi et al. |

FOREIGN PATENT DOCUMENTS

| | | | |
|---|---|---|---|
| DE | 10203636 A1 | 8/2003 | |
| DK | WO 02/41999 | * 5/2002 | ................ B01L 7/00 |
| EP | 0500727 A1 | 9/1992 | |
| EP | 1145766 A2 | 10/2001 | |
| EP | 1179585 A2 | 2/2002 | |
| EP | 1304388 A2 | 4/2003 | |
| EP | 1945368 A2 | 7/2008 | |
| EP | 2260943 A1 | 12/2010 | |
| EP | 1861509 B1 | 9/2015 | |
| JP | 58-211272 A | 12/1983 | |
| JP | 60-071935 A | 4/1985 | |
| JP | 2000-292480 A | 10/2000 | |
| JP | 2002-503334 A | 1/2002 | |
| JP | 2002-311461 A | 10/2002 | |
| JP | 2002-536167 A | 10/2002 | |
| JP | 2003-121886 A | 4/2003 | |
| JP | 2003-202604 A | 7/2003 | |
| JP | 2004-000935 A | 1/2004 | |
| JP | 2005-501296 A | 1/2005 | |
| JP | 2005-507997 A | 3/2005 | |
| JP | 2005-510705 A | 4/2005 | |
| JP | 2005-176836 A | 7/2005 | |
| JP | 2005-257283 A | 9/2005 | |
| JP | 2005-304445 A | 11/2005 | |
| JP | 2006-504974 A | 2/2006 | |
| JP | 2006-512092 A | 4/2006 | |
| JP | 2006-517024 A | 7/2006 | |
| JP | 2007-017163 A | 1/2007 | |
| JP | 2008-533487 A | 8/2008 | |
| WO | 91/07660 A1 | 5/1991 | |
| WO | 91/08284 A1 | 6/1991 | |
| WO | 98/04355 A1 | 2/1998 | |

(56) References Cited

FOREIGN PATENT DOCUMENTS

| | | |
|---|---|---|
| WO | 99/17883 A1 | 4/1999 |
| WO | 00/28313 A1 | 5/2000 |
| WO | 00/47322 A2 | 8/2000 |
| WO | 00/69525 A1 | 11/2000 |
| WO | 00/69565 A1 | 11/2000 |
| WO | 01/21311 A1 | 3/2001 |
| WO | 02/12896 A1 | 2/2002 |
| WO | 02/88702 A2 | 11/2002 |
| WO | 03/14739 A1 | 2/2003 |
| WO | 03/35894 A2 | 5/2003 |
| WO | 03/35895 A2 | 5/2003 |
| WO | 03/45556 A2 | 6/2003 |
| WO | 03065028 A1 | 8/2003 |
| WO | 2004/030820 A2 | 4/2004 |
| WO | 2004/071668 A1 | 8/2004 |
| WO | 2005/060432 A2 | 7/2005 |
| WO | 2005/098395 A1 | 10/2005 |
| WO | 2006/003214 A2 | 1/2006 |
| WO | 2006/008602 A2 | 1/2006 |
| WO | 2006/018849 A2 | 2/2006 |
| WO | 2007/010367 A2 | 1/2007 |
| WO | 2007/049103 A1 | 5/2007 |
| WO | 2007/049120 A2 | 5/2007 |
| WO | 2007/110739 A2 | 10/2007 |
| WO | 2007/116312 A2 | 10/2007 |
| WO | 2007/147018 A1 | 12/2007 |
| WO | 2007/147076 A2 | 12/2007 |
| WO | 2008/112274 A2 | 9/2008 |
| WO | 2008/131035 A2 | 10/2008 |
| WO | 2009/022222 A2 | 2/2009 |
| WO | 2010/106426 A1 | 9/2010 |
| WO | 2010/106434 A1 | 9/2010 |
| WO | 2010/143954 A1 | 12/2010 |
| WO | 2010/149292 A1 | 12/2010 |

OTHER PUBLICATIONS

Berthier et al., NSTI Nanotech 2005, vol. 1 (2005), www.nsti.org.
Bonci et al., The miR-15a-miR-16-1 cluster controls prostate cancer by targeting multiple oncogenic activities, Nat. Med., 14:1271-7 (2008).
Carver et al., High-resolution multiparameter DNA flow cytometry for the detection and sorting of tumor and stromal subpopulations from paraffin-embedded tissues, Curr. Protoc. Cytom., Chapter 6, Unit 6.27 (2009).
Cheung et al., Impedance spectroscopy flow cytometry: on-chip label-free cell differentiation, Cytometry Part A, 65A(2):124-32 (2005).
De Bono et al., Circulating tumor cells predict survival benefit from treatment in metastatic castration-resistant prostate cancer, Clin. Cancer Res., 14(19):6302-9 (2008).
Diamond et al., Flow cytometry in the diagnosis and classification of malignant lymphome and leukemia, Cancer, 50:1122-35 (1982).
Fiedler et al., Electrocasting formation and structuring of suspended microbodies using A.C. generated field cages, Microsystem Technologies, Berlin, Germany, pp. 1-7 (Dec. 1, 1995).
Fuchs et al., "Electronic sorting and recovery of single live cells from microlitre sized samples," Lab Chip, 6:121-126 (2006).
Fuhr et al., Positioning and manipulation of cells and microparticles using miniturized electric field traps and travelling waves, Sensors and Materials, 7(2):131-46 (1995).
Gascoyne et al., Dielectrophoresis-based programmable fluidic processors, Lab Chip, 4:299-304 (2004).
Gascoyne et al., Particle separation by dielectrophoresis, Electrophoresis, 23(13): 1973-83 (2002).
Green et al., Ac Electrokinetics: a survey of sub-micrometre particle dynamics, J. Phys. D: Appl. Phys., 33:632-41 (Dec. 10, 1999).
Hughes, Strategies for dielectrophoretic separation in laboratory-on-a-chip systems, Electrophoresis, 23(16): 2569-82 (2002).
International Application No. PCT/IB2012/055981, International Preliminary Report on Patentability, dated May 8, 2014.
International Application No. PCT/IB2012/055981, International Search Report and Written Opinion, dated Jan. 22, 2013.
Jones, An electromechanical interpretation of electrowetting, J. Micromech. Microeng., 15(6):1184-7 (2005).
Klein et al., Comparative genomic hybridization, loss of heterozygosity, and DNA sequence analysis of single cells, Proc. Natl. Acad. Sci. USA, 96(8):4494-9 (1999).
Long et al., A new preprocessing approach for cell recognition, IEEE Trans. Information Tech. Biomed., 9(3):407-12 (2005).
Manaresi et al., A CMOS chip for individual cell manipulation and detection, IEEE Journal of Solid-State Circuits, 38(12):2297-305 (2003).
Medoro et al., A lab-on-a-chip for cell detection and manipulation, IEEE Sensors Journal, 3(3):317-25 (2003).
Medoro et al., A lab-on-a-chip for cell separation based on the moving-cages approach, Proceedings of the 16th Conference on Solid State Transducers, pp. 500-501 (Sep. 15, 2002).
Medoro et al., Dielectrophoretic cage-speed separation of bio-particles, Sensors, Proceedings of the IEEE Vienna, Austria, Oct. 24-27, 2004, pp. 76-79.
Milner et al., Dielectrophoretic classification of bacteria using differential impedance measurements, Electronics Letters, 34(1):66-8 (1998).
Nagrath et al., Isolation of rare circulating tumour cells in cancer patients by microchip technology, Nature, 450(7173):1235-9 (2007).
Nieuwenhuis et al., Near-field optical sensors for particle shape measurements, Sensors Journal IEEE, 3(5):646-51 (2003).
O'Hara et al., Ratcheting electrophoresis microchip (REM) for programmable transport and separation of macromolecules, Proceedings of the International Mechanical Engineering Congress and Exposition, 3:619-28 (2001).
Office Action (with English translation), Japanese Patent Application No. 2014-537803, dated Jun. 3, 2016.
Ohta et al., Tech. Dig. of the Solid State Sensor, Actuator and Microsystems, Workshop, pp. 216-219 (2004).
Petersson et al., Carrier medium exchange through ultrasonic particle switching in microfluidic channels, Anal. Chem., 77:1216-21 (2005).
Pthig et al., Enhancing traveling-wave dielectrophoresis with signal superposition, IEEE Eng. Med. Biol. Mag., 22(6):43-50 (2003).
Reichle et al., Combined laser tweezers and dielectric field cage for the analysis of receptor—ligand interactions on single cells, Electrophoresis, 22(2):272-82 (2001).
Romani et al., Capacitive sensor array for localization of bioparticles in CMOS lab-on-a-chip, Proc. Int. Solid State Circuit Conference, 1:224-5 (2004).
Rousselet et al., Directional motion of brownian particles induced by a periodic asymmetric potential, Nature, 370(6489):446-8 (1994).
Schnelle et al., Three-dimensional electric field traps for manipulation of cells—calculation and experimental verfication, Biochem. Biophys. Acta, 1157(2):127-40 (1993).
Stoecklein et al., Direct genetic analysis of single disseminated cancer cells for prediction of outcome and therapy selection in esophageal cancer, Cancer Cell, 13:441-53 (2008).
Suehiro, The dielectrophoretic movement and positioning of a biological cell using a three-dimensional grid electrode system, J. Phys. D: Appl. Phys., 31:3298-305 (1998).
Vona et al., Isolation by size of epithelial tumor cells : a new method for the immunomorphological and molecular characterization of circulatingtumor cells, Am. J. Pathol., 156(1):57-63 (2000).
Zieglschmid et al., Detection of disseminated tumor cells in peripheral blood, Grit. Rev. Clin. Lab. Sci., 42(2):155-96 (2005).

* cited by examiner

METHOD AND DEVICE FOR OPTICAL ANALYSIS OF PARTICLES AT LOW TEMPERATURES

CROSS-REFERENCE TO RELATED APPLICATIONS

This is a divisional of U.S. patent application Ser. No. 14/353,303, filed Apr. 22, 2014 which is the U.S. national phase of International Application No. PCT/IB2012/055981, filed Oct. 29, 2012, which claims the benefit of Italian Patent Application No. TO2011A000990, filed Oct. 28, 2011.

TECHNICAL FIELD

The present invention concerns methods and devices for the manipulation of particles in suspension in a fluid, for example contained in conductive or highly conductive solutions, when optical analysis of the manipulated particles has to be performed at temperatures below ambient temperature. The invention can be applied mainly in the implementation of biological protocols on live cells.

STATE OF THE ART

The patent application PCT/WO 00/69565 to G. Medoro describes a device and a method for the manipulation of particles via the use of closed dielectrophoretic potential cages. The force used to maintain the particles in suspension or to move them inside the microchamber dissipates, by Joule effect, a power which is proportional to the square of the amplitude of the voltages applied and grows linearly with the increase in the electrical conductivity of the liquid in suspension, causing an uncontrolled increase in temperature inside the microchamber. The manipulation operations can be individually controlled by the programming of memory elements and circuits associated with each element of an array of electrodes integrated in the same substrate; said circuits contribute to the temperature increase, dissipating power in the substrate in direct contact with the suspension liquid. This results in an important limitation due to the variation in the gene expression or to high levels of stress or to the death of the biological particles present in the sample for solutions with high electrical conductivity, limiting the application of these methods and devices to the use of beads or non-live cells.

The limitations of the known art are overcome by the patent application EP1945368 in the name of the same Applicant, which allows the manipulation of biological particles by means of the technique described in PCT/WO 00/69565 (or by means of other techniques that develop heat) preserving the vitality and biological functions of the cells independently of the forces used and/or the conductivity of the liquid in suspension, therefore allowing the manipulation of live cells.

However, numerous applications require the suspension liquid and/or all the interior of the microchamber to be maintained, during the manipulation procedure, at temperatures far below the ambient temperature, for example at temperatures below 10° C. and, more frequently, between 3 and 5° C., for example 4° C.

At such low temperatures ambient humidity condenses on the outer surface of the microchamber cover, which is made of transparent material in order to permit observation and optical analysis of the cells in suspension, either by means of devices or sensors outside the microchamber, for example an optical microscope, or by means of optical sensors inside the microchamber, integrated in the substrate, which, however, require adequate external lighting in order to function correctly.

The presence of condensed humidity on the microchamber cover causes both blurring of the image that can be acquired from the outside and alteration in the passage of the external light, preventing correct performance of the analysis protocols, unless non-optical internal sensors are relied upon completely, for example impedentiometric sensors, but this is not always possible or convenient.

SUBJECT OF THE INVENTION

The present invention concerns a method and device for performing the optical analysis of particles contained in suspension in a fluid, typically a liquid, arranged inside a microfluidic device which maintains it at a temperature significantly lower than the ambient temperature and such as to trigger phenomena of condensation on the outer surface of the microfluidic device. Typically, the microfluidic device serves to perform manipulation and/or control of the position of the particles, for example by means of electrical force fields in electrically conductive solutions, and more generally by means of any other system, in conditions that simultaneously require a relatively low operating temperature and performance of an optical analysis of the position and/or appearance of the manipulated particles, or for the detection of morphological parameters or for the quantification of fluorescence intensity. The force fields can be dielectrophoresis (positive or negative), magnetophoresis, electrophoresis, electrohydro-dynamic or electrowetting on dielectric, or combinations of these phenomena, characterised by a set of points of stable equilibrium for the particles. Optical tweezers can also be used.

The main aspect of the invention concerns prevention of the condensation of humidity on the outer surface of the cover of a microfluidic device operating with a relatively low internal temperature either by increase in the temperature of the outer surface of the cover to above the condensation temperature (dew point), or by lowering the temperature and/or ambient humidity in the vicinity of the cover of the microfluidic device, so as to bring the condensation temperature (dew point) to below the internal operating temperature of the microfluidic device.

For said purpose, the system can benefit from the use of one or more integrated or external sensors for control of the temperature and, if necessary, of the ambient humidity and temperature of the outer surface of the cover by means of a feedback control.

The invention furthermore allows the use of external optical systems of the transmission type.

DETAILED DISCLOSURE

Hereinbelow, the term particles will be used to indicate micrometric or nanometric entities, natural or artificial, such as cells, subcellular components, viruses, liposomes, niosomes, microbeads and nanobeads, or also smaller entities such as macro-molecules, proteins, DNA, RNA, etc., also drops of liquid immiscible in the suspension medium, for example oil in water, or water in oil, or also drops of liquid in gas (such as water in air) or bubbles of gas in liquid (such as air in water).

The object of the present invention is to provide a method and a device for the optical analysis of particles at temperatures below ambient temperature and, in particular, at relatively low temperatures (3-6° C.), the particles being maintained in suspension in a fluid, typically a liquid, arranged inside a microfluidic device, which also allows manipulation of the particles.

By manipulation we mean control of the position of single particles or groups of particles or the movement in space of said particles or groups of particles.

Said manipulation can be performed by any means integrated in the device according to the invention or interacting with it from the outside. Typically the manipulation is performed by means of an array of electrodes, which can be selectively activated and addressed, integrated in a substrate and facing one single counter-electrode which also acts as a cover of the microchamber, according to the description in PCT/WO 00/69565, the content of which is incorporated herein for the necessary parts.

With reference to the FIGS. 1A, B and 2, the reference number 1a, respectively 1b, indicates a device for performing optical analysis of particles 2 contained in suspension in a fluid 3, typically a liquid, capable of operating by maintaining the particles 2 and the liquid 3 at temperatures below ambient temperature and, in particular, near to zero degrees centigrade, typically temperatures between 3 and 6° C. and preferably at a temperature of approximately 4° C.

Figure 1A:
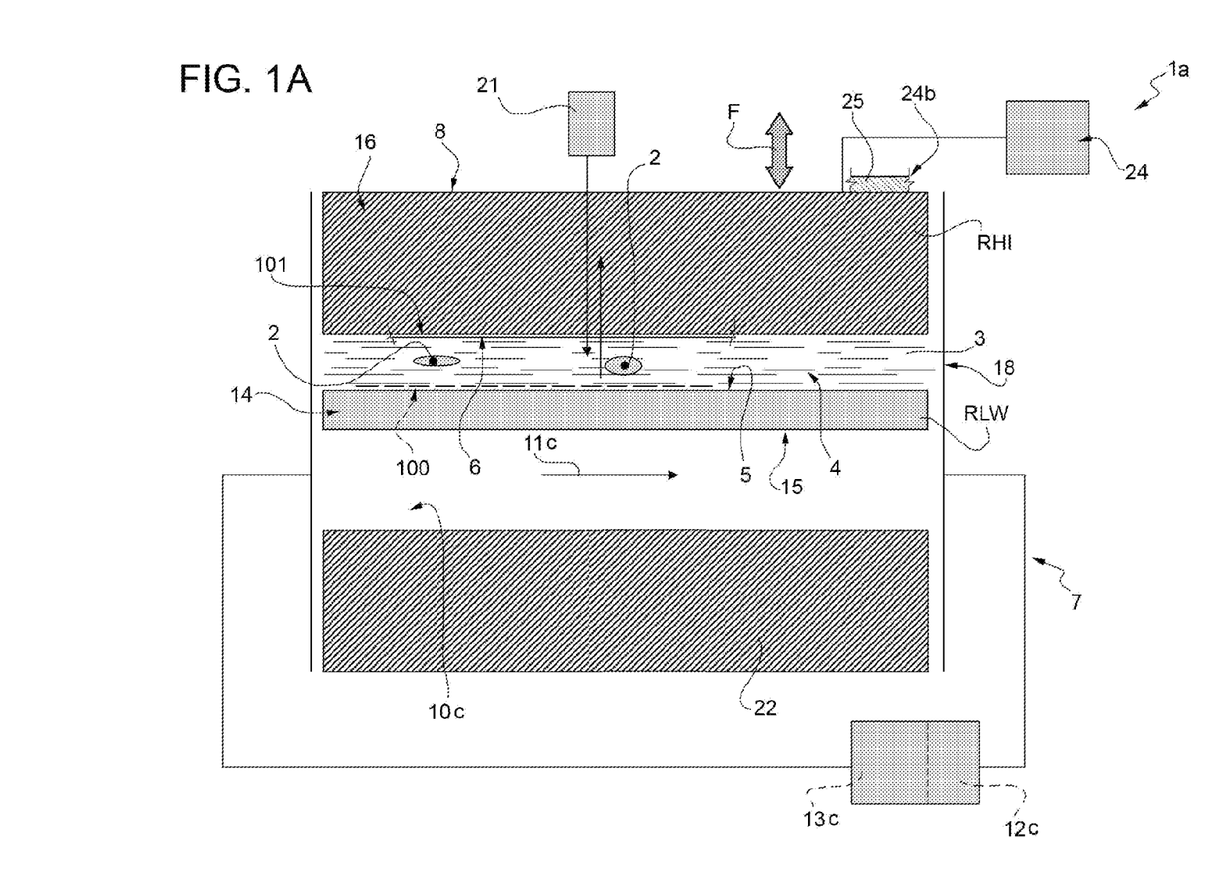
FIGS. 1A and 1B illustrate schematically in longitudinal section two different embodiments of a microfluidic device which implements a first embodiment of the method of the invention.
Figure 1B:
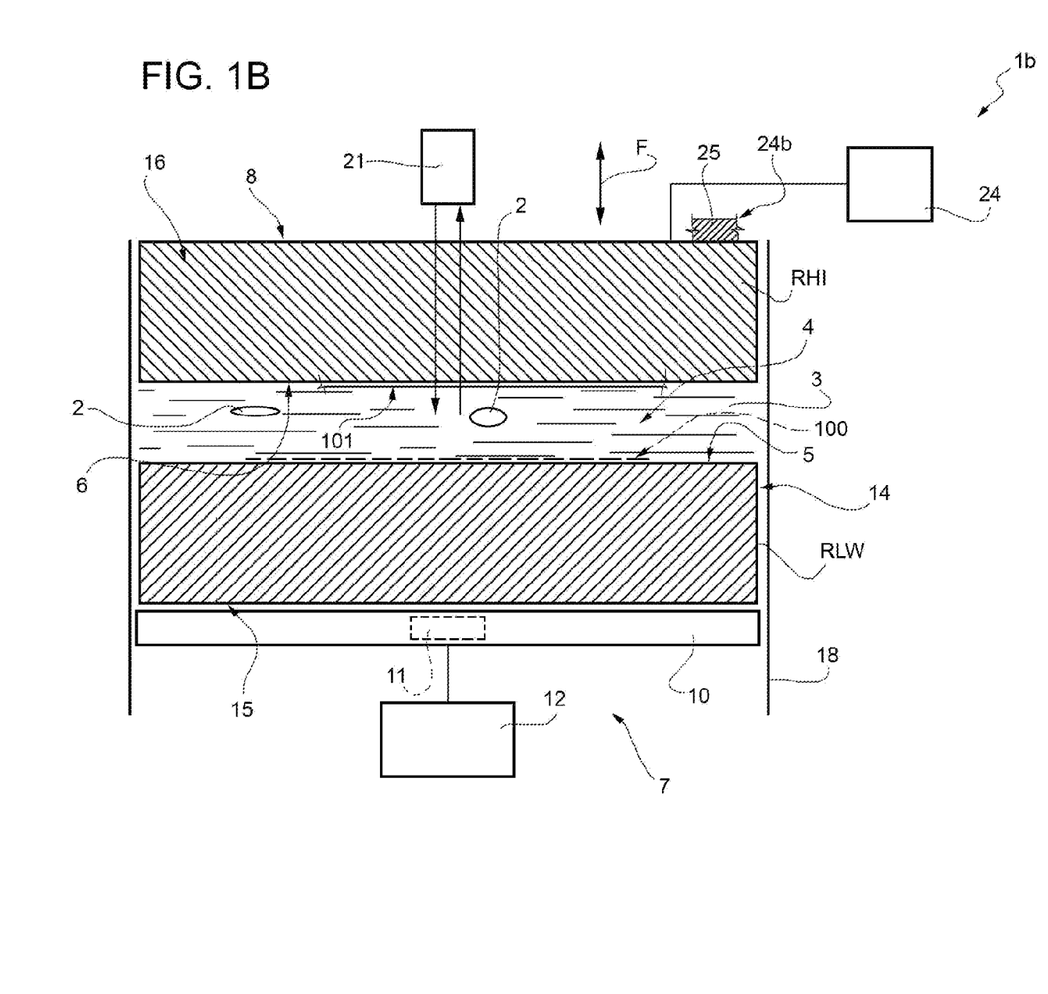
Figure 2:
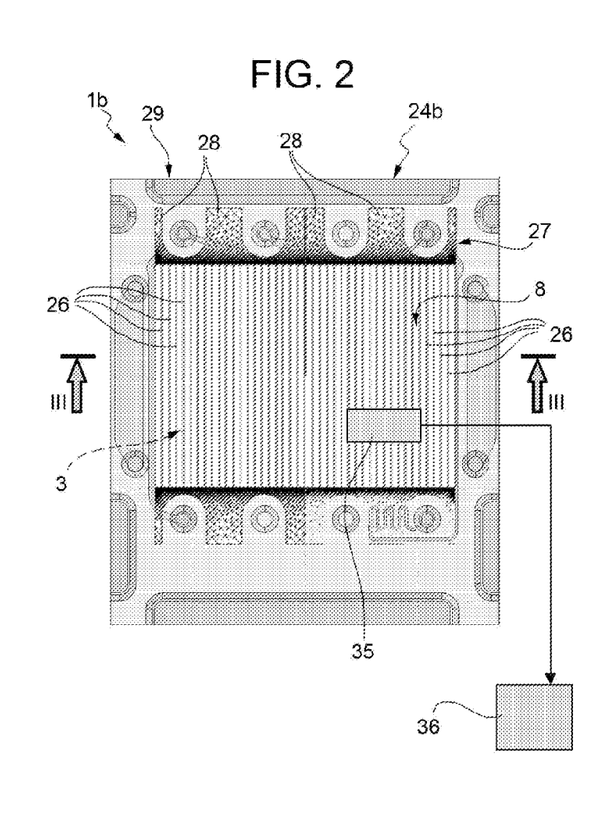
FIG. 2 illustrates schematically an overhead plan view of an embodiment of the microfluidic device of FIG. 1.

The device 1a, 1b comprises, according to the outlined schematic sketches illustrated in FIGS. 1A and 1B, where similar or identical details are indicated by the same reference numbers for the sake of simplicity, at least one microchamber 4 containing in use the fluid 3 and delimited between a first surface 5 and a second surface 6; and cooling means, indicated overall by 7, thermally coupled with the surface 5 by means of a first thermal resistance RLW.

By the term "microchamber" we mean here and below a chamber suitable for containing a small volume of fluid 3, typically between 1 nanolitre and 5000 microlitres, and preferably between 1 microlitre and 100 microlitres and having one of its three dimensions measuring less than 1 mm.

The device 1 furthermore comprises a thermal inspection surface 8 thermally coupled with the surface 6 via a second thermal resistance RHI.

The cooling means 7 can be of any appropriate type adapted to subtract heat from the microchamber 4 while the device 1a/1b is operative and performs manipulation of the particles 2, in a quantity such as to maintain the fluid 3 at a first pre-set temperature T1, below the ambient temperature, as already indicated typically 4° C.

In the example illustrated in FIG. 1B, the cooling means 7 consist of a plate 10 arranged in contact with the thermal resistance RLW and in which one or more Peltier cells 11 are integrated (only one of which is shown only schematically, since it is known per se) controlled by a device 12 for controlling the internal temperature of the chamber 4, only schematically represented by a block.

In the example illustrated in FIG. 1A, on the other hand, the cooling means 7 consist of a second microchamber 10c, in which a flow of coolant 11c runs, in contact with the thermal resistance RLW; said coolant is indicated by an arrow in FIG. 1A and is circulated in a closed circuit from which the heat removed from the microchamber 4 through the surface 5 is continuously eliminated by means of a pump 12c coupled with a Peltier cell, 13c, indicated schematically by a block.

Figure 3:
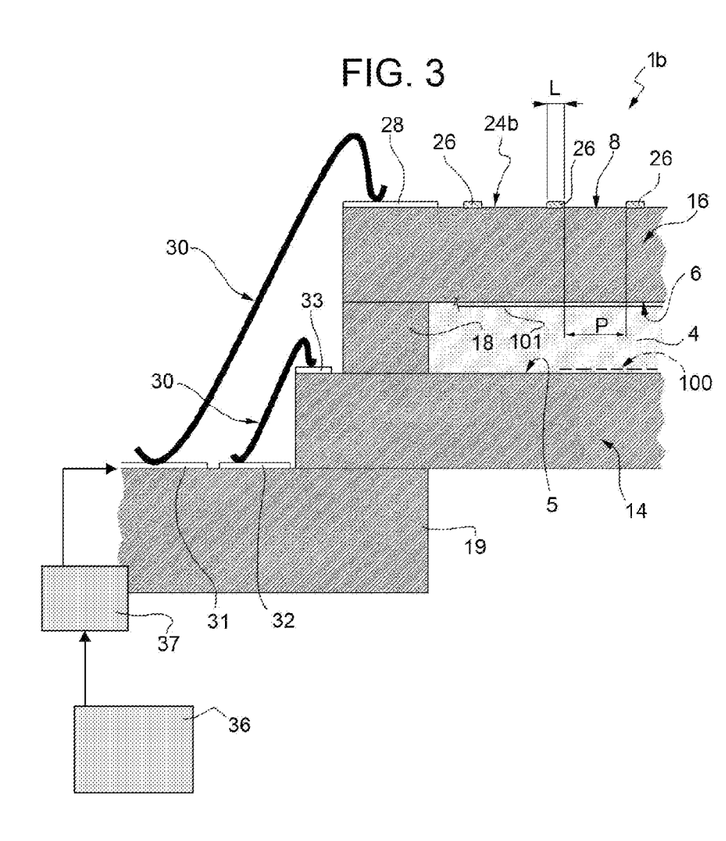
FIG. 3 illustrates schematically on an enlarged scale a vertical section of the microfluidic device of FIG. 2.

With reference also to FIGS. 2 and 3, the thermal resistance RLW consists of a flat sheet 14, for example a quartz sheet, transparent if necessary, a first upper face of which consists of the surface 5 and a second lower face of which consists of a surface 15 arranged in contact with the plate 10; the thermal resistance RHI consists of a flat sheet 16, necessarily made of a transparent material, for example consisting of a sheet of mineral glass or quartz, a first face of which, facing the side opposite the microchamber 4, constitutes the optical inspection surface 8, and a second face of which, opposite the first face, constitutes the surface 6.

The two sheets 14,16 are arranged facing and are separated from each other by a perimeter spacer 18 (indicated schematically only by a line in FIG. 1), which delimits together with the sheets 14,16 the inner volume of the microchamber 4. Either the latter, or the whole unit consisting of the sheets 14,16 and the spacer 18, rests on a base 19 (FIG. 3).

The device 1a/1b according to the invention also comprises electronic means for manipulating the particles 2 before, during and after optical analysis of the same.

If dielectrophoresis potential cages, as described in WO 00/69565, are used to manipulate the particles 2, the surface 5 constitutes the substrate which supports an array 100 of microelectrodes, while the surface 6 is entirely coated by an ITO layer 101, which constitutes the counter-electrode. In addition to the microelectrodes of the array 100, one or more optical sensors can be integrated in the substrate to detect any alterations (due for example to the presence of a particle 2) of the ambient light which penetrates into the microchamber 4 through the surface 8. Alternatively or in addition, optical sensors can be provided outside the microchamber 4, for example consisting of a simple microscope 21 of any type, indicated schematically by a block in FIGS. 1A and 1B, which observes the inside of the microchamber 4 through the surface 8. The microscope 21 can identify images and receive any light reflected from the substrate consisting of the surface 5 for example according to the trajectories indicated by the arrows in FIGS. 1A, 1B.

According to a first embodiment of the invention, the second thermal resistance RHI has a thermal conductivity value of at least one order of magnitude and, preferably, two orders of magnitude, below that of the first thermal resistance RLW; for example, with the materials indicated above, the sheet 14 has a conductivity of approximately 150 W/° K.·m while the sheet 16 has a thermal conductivity of only approximately 1.2 W/° K.·m.

In combination with this characteristic, the device 1 furthermore comprises, according to the invention, means 24, indicated schematically by a block in FIG. 1, to establish a thermal flow F (indicated schematically by a double arrow in FIG. 1) at the optical inspection surface 8 such that the surface 8 is constantly maintained at a temperature T2 higher than the temperature Td of condensation of the ambient humidity (dew point) contained in the air which laps in use the optical inspection surface 8.

Figure 4:
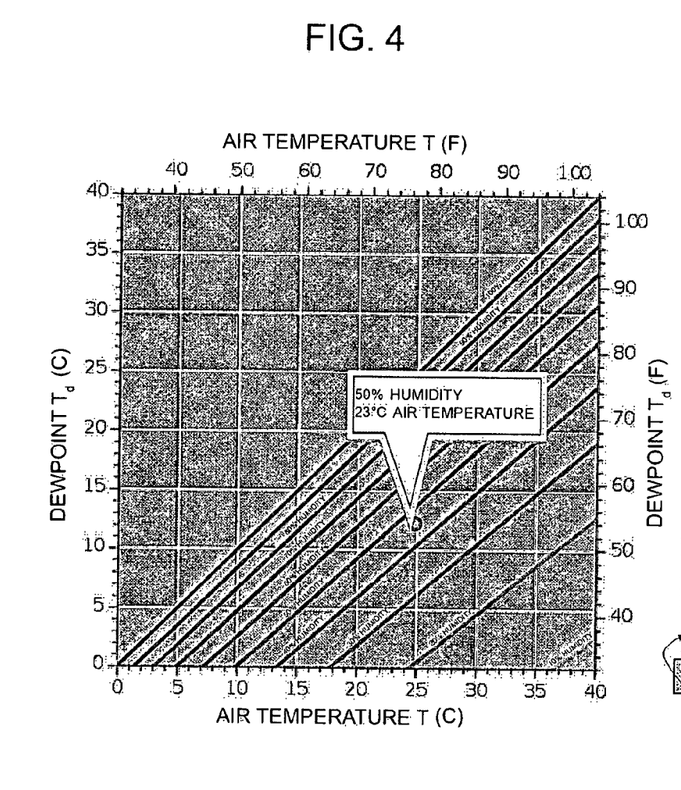
FIG. 4 is a diagram showing the variation in dew point according to the humidity and temperature of the air.

As illustrated in the diagram of FIG. 4, the temperature Td can be easily calculated according to the temperature of the ambient air and the amount of humidity present in the ambient air. For mean values usually found in a laboratory (23° C. and 50% humidity), the temperature Td is approximately 12° C. It is evident that since the temperature T1 in the microchamber 4 is approximately 4° C., the temperature of the surface 8 would inevitably reach, in use, by conduction, a temperature lower than Td, producing blurring of the surface 8.

This phenomenon is avoided according to the invention by the combination of an appropriate choice of the ratio between the thermal conductivities of the thermal resistances RLW and RHI and the simultaneous presence of the means 24. This combination surprisingly allows, on the one hand, as will be seen, a temperature T2 of the surface 8 to be maintained always higher than the temperature Td of the air that laps in use the surface 8, so as to avoid and/or eliminate blurring of the surface 8 when the temperature T1 inside the microchamber 4 is very low. On the other hand, possible heating of the fluid 3 is avoided or at least limited. In fact it has been experimentally shown that even if a "hot" thermal flow reaches the microchamber 4, any increase in the temperature T1 can be easily avoided by lowering the temperature set by the control unit 12 on the Peltier cell 11 without triggering undesired convective motions inside the microchamber 4.

According to a first possible embodiment of the invention, the device 1b (or 1a) comprises means 24b(FIGS. 2,3) to heat the optical inspection surface 8 to above the dew point of the ambient air, or above the temperature Td.

Said means 24b consist in a resistor directly applied integrally in one piece on the surface 8 of the sheet 16. According to an embodiment example illustrated only schematically and only partly in FIG. 1, the resistor 24b consists of a transparent conductive resistive layer 25, for example ITO, applied uniformly over the whole optical inspection surface 8.

In a second possible embodiment of the invention, the resistor 24b consists of at least one and preferably a plurality of filiform microresistors, or wires, 26 applied integrally in one piece to the optical inspection surface 8, preferably arranged in a comb shape and uniformly spaced from one another.

The filiform microresistors 26 are electrically connected, each at the same one end thereof, to a distribution frame 27 of the electrical supply current, consisting of a metal foil in a comb shape, but arranged opposite the filiform microresistors 26; in other words, respective "teeth" 28 of the comb-shaped metal foil 27 face the side opposite the wires 26 and extend outside the surface 8, being arranged on one edge 29 of the device 1 outside the operating area consisting of the microchamber 4.

The frame 27 receives the electrical supply current through the "teeth" 28, by means of a plurality of conductor bridges 30 which connect a plurality of different points of the frame 27, consisting of the "teeth" 28, to at least one common collector 31 arranged at the base element 19 of the device 1.

The conductor bridges 30 consist of deformable metal wires bent to form S-shaped frames or forks on the plane of FIG. 3. The electrical supply of the electrodes and any optical sensors in the substrate that may be present on the surface 5 is also provided by bridges 30, using other collectors 32,33.

To allow the device 1b (1a) to operate correctly, i.e. to maintain the temperature T2 above the temperature Td of the air that laps in use the surface 8 without excessive heat loss towards the microchamber 4, to maintain the temperature of the entire surface 8 as uniform as possible and not interfere with the integrated optical sensors and/or with the external sensors, like the microscope 21, the filiform microresistors 26 must have a width L (FIG. 3) equal to approximately one tenth of the pitch P (i.e. the spacing) between the same in a direction transverse to their longitudinal extension. In other words, the L/D ratio must be preferably equal to ¹/₁₀ and in any case be between ½ and ¹/₁₀₀.

To improve the performance of the device 1b (1a), it preferably also comprises means 35 (FIG. 2) to continuously measure in use the temperature T2 of the surface 8 and means 36 to operate in feedback the means 24b to heat the optical inspection surface; for example the temperature detection means 35 can consist of an electrical resistance applied on the surface 8, which varies its resistivity according to the temperature T2, or of an optical sensor arranged facing the surface 8; in the first case, one of the filiform microresistors 26 can be used as the electrical resistance, making the appropriate electrical connections. The means 36 consist of the microprocessor which controls all the functions of the device 1b (1a) or of a dedicated microprocessor, and they interact for example with a power supply unit 37 (FIG. 3) which controls the current supplied to the frame 27 via the bridges 30. There must be a large, number of the latter, so that the spacing intervals there between make the temperature on the opposite side of the sheet 16 substantially uniform.

Figure 6:
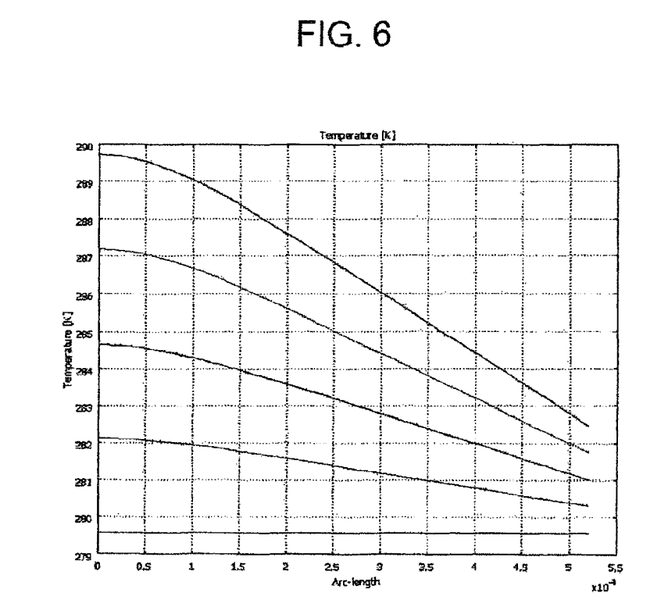
FIGS. 6 and 7 are diagrams showing the variation in temperature of the upper surface of the microfluidic device of FIG. 2 on the basis of the variation of some operating parameters.
Figure 7:
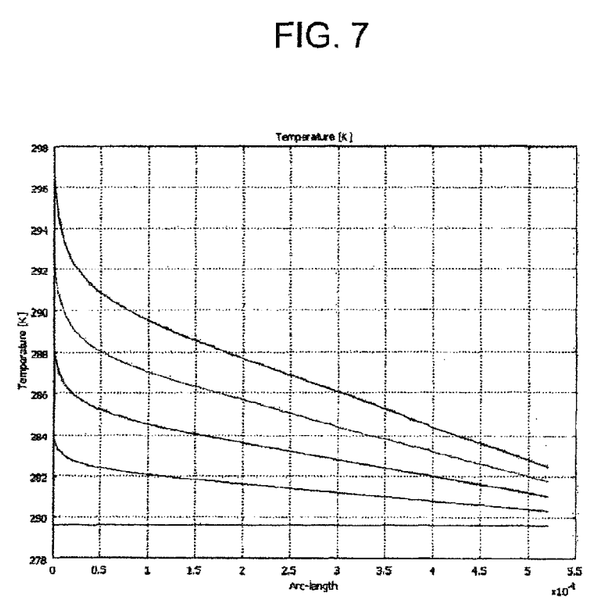

Observing the parameters indicated, the trend of the temperature gradient through the thickness of the sheet 16 for different levels of electrical power supplied to the wires or "fingers" 26 is the one shown in FIG. 6, which represents the worst scenario, in other words in the middle of the pitch P, i.e. the temperature at the surface area 8 without resistors comprised between two filiform microresistors or "fingers" 26, and in FIG. 7, which shows the best scenario, i.e. the temperature directly below a microresistor or "finger" 26. The temperature gradient that can be maintained through the sheet 16, taking account of the heat losses towards the outside, allows a temperature very close to T1 to be maintained on the surface 6, while the temperature T2 on the surface 8 is uniformly higher than the temperature Td.

For this purpose, and independently of the embodiment of the heating means 24b, it is also convenient for the thickness of the sheet 16 to be determined at the project stage using the following formula:

$$H_{lid} > \left(\frac{T_{dp} - T_0 - \Delta T_{max}}{\Delta T_{max}}\right)\left(\frac{\sigma_{lid}}{\sigma_{buf}}\right) H_C \quad (1)$$

$$\Delta T_{max} = (T_{buf} - T_0)_{max} \quad (2)$$

where $H_{lid}$ and $H_c$ are respectively the thickness of the sheet constituting the cover of the microchamber 4 and the thickness of the microchamber 4 itself, $T_{dp}$ is the dew point temperature of the ambient air, $T_o$ is the theoretical operating temperature desired inside the microchamber 4, $T_{buf}$ coincides with the temperature T1, i.e. it is the temperature of the liquid 3, $\Delta T_{max}$ is the maximum increase in temperature tolerable inside the microchamber 4 with respect to the theoretical operating temperature $T_o$, $\sigma_{lid}$ and $\sigma_{buf}$ are the thermal conductivity of the material of the sheet 16 and of the liquid (buffer) 3 respectively.

Figure 5:
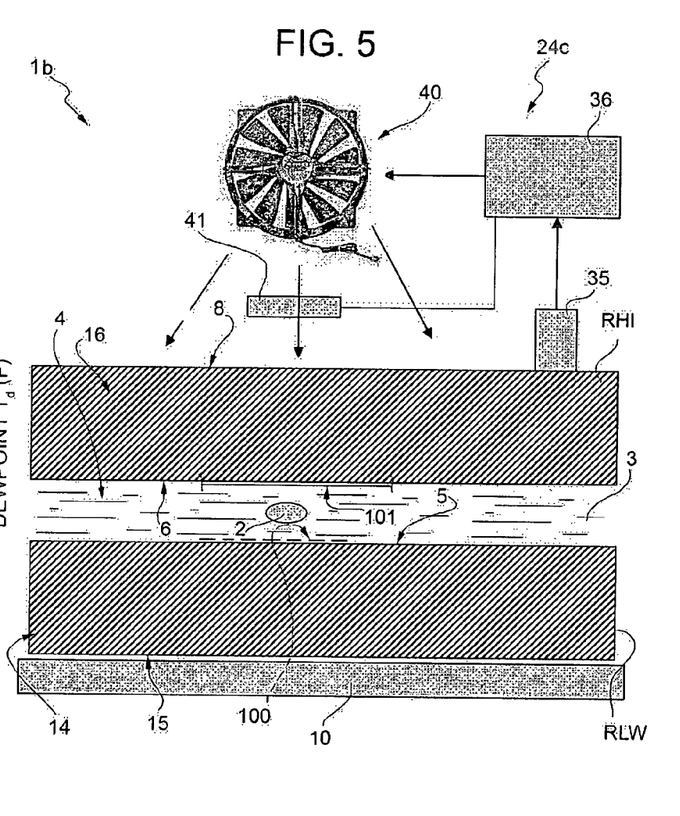
FIG. 5 illustrates schematically in longitudinal section a microfluidic device which implements a second embodiment of the method of the invention.

With reference to FIG. 5, where the details similar or identical to those already described are indicated by the same numbers, the device 1b comprises heating means 24c located outside the sheet 16 and consisting in the example illustrated of a fan 40 and a resistance 41 which, controlled by the control unit 36 connected to a sensor 35 of the temperature T2 of the surface 8 heat the latter, sending to it a flow of ambient air.

On the basis of the description, the invention therefore also concerns a method for performing the optical analysis of particles 2 contained in suspension in a fluid 3, at temperatures below the ambient temperature, comprising the steps of:

i.—arranging the particles 2 in suspension inside at least one microchamber 4 containing the fluid 3 in a space delimited between the surfaces 5 and 6;

ii.—thermally coupling the surface 5, via the thermal resistance RLW, with the cooling means 7 adapted to subtract heat from the fluid 3, and thermally coupling the surface 6, via the thermal resistance RHI, with the optical inspection surface 8 to be maintained clear;

iii.—bringing the fluid 3 to the temperature T1, lower than the ambient temperature, by means of the cooling means 7; and iv.—while the particles 2 are being optically analysed, establishing at the optical inspection surface 8 a thermal flow F such that the optical inspection surface 8 is constantly maintained at the temperature T2, higher than the temperature Td of condensation of the ambient humidity (dew point) contained in the air which laps the optical inspection surface;

v.—where the thermal resistances RHI and RLW are chosen so that the thermal resistance RHI has a thermal conductivity value preferably at least one order of magnitude below that of the first thermal resistance RLW and, in any case, equal to at least half of the thermal conductivity of the thermal resistance RLW.

Typically, the thermal flow F is an input thermal flow, in the sense that step (iv) is performed by heating the optical inspection surface 8 to above the dew point of the ambient air, as previously illustrated.

Heating of the surface 8 can be obtained, preferably, by Joule effect, providing on the same, outside the microchamber 4, a resistor 24b chosen from the group consisting of: a transparent conductive resistive layer, for example of Indium Tin Oxide (ITO, or based on nano tubes of carbon, or conductive polymers such as poly(3,4-ethylenedioxythiophene) (PEDOT)) 25 uniformly applied over the entire optical inspection surface 8; a plurality of filiform microresistors 26 applied on the optical inspection surface 8, arranged in a comb shape, uniformly spaced from one another transverse to the direction of longitudinal extension of the microchamber 4.

The filiform microresistors 26 which, according to an embodiment not illustrated for the sake of simplicity, can also be arranged in a grid pattern, or so as to cross one another, are in any case supplied so that the current density distribution is uniform; in the case illustrated, using the current distribution frame 27 arranged longitudinally orthogonal to the filiform microresistors 26, which in turn receives the current by means of a plurality of conductor bridges 30 which connect a plurality of different points 28 of the distribution frame 27, arranged on the side opposite the filiform microresistors 26, to at least one common collector 31.

Alternatively, as has been seen, the optical inspection surface 8 is maintained at a temperature higher than the dew point by forcing an air flow over the same by forced convection, generated for example by a fan 40. Said flow counters the lowering of the temperature of the optical inspection surface 8 due to the absorption of heat by the cooling system through the liquid in the microchamber 4, as illustrated in FIG. 5.

In any case, heating of the optical inspection surface 8 is preferably feedback controlled by continuously measuring the current temperature T2 of the same, preferably by means of a resistance 35 applied to the optical inspection surface 8 or by means of an infrared sensor arranged facing the optical inspection surface 8.

According to a different embodiment of the invention, however, the step (iv) can be performed equally effectively by cooling a quantity of ambient air immediately surrounding the optical inspection surface 8 which laps the same, at a temperature T3 such that the dew point of said quantity of air becomes lower than the temperature T2 of the optical inspection surface 8 due to thermal transmission by conduction from and to the microchamber 4 through the thickness of the sheet 16.

A solution of this kind can be implemented by a device 1b (or 1a) similar to the one illustrated schematically in FIG. 5, where a fan 40 is used to recirculate the same quantity of air present in the vicinity of the surface 8 through a cooling element 41, for example consisting of a set of Peltier cells all arranged around the sheet 16.

The temperature Td, especially in the implementations previously described, can be fixed beforehand, taking 12° C. as a fixed estimate, which is the value that occurs in the majority of cases. Vice versa, the actual temperature Td of the ambient air and the cooled air which laps the surface 8 due to the action of the fan 40 is calculated, for example, by detecting both the temperature and ambient humidity, and those of said cooled air, by means of appropriate sensors 42 connected to the control unit 36.

Obviously the cooling caused by the set of Peltier cells which establishes the required thermal flow F according to the invention can be used to lower both the temperature and humidity of the ambient air, or only the temperature or only the humidity.

The invention claimed is:

1. A method of performing optical analysis and manipulation of particles in suspension in a fluid contained in a microchamber, the microchamber having an internal volume for containing the particles in suspension in the fluid, the internal volume being delimited by interior surfaces of oppositely disposed first and second sheets defining bottom and top surfaces of the microchamber, an exterior surface of the second sheet being an optical inspection surface, the method comprising:

cooling the fluid contained in the microchamber to a first temperature using a cooling device thermally coupled to the first sheet, wherein the first temperature is below ambient temperature;

generating a thermal flow across the optical inspection surface to heat and maintain the optical inspection surface at a second temperature, the second temperature being higher than a condensation temperature of ambient humidity surrounding the optical inspection surface; and performing an optical inspection of the particles in suspension through the optical inspection surface while the fluid in the microchamber is maintained at the first temperature and while the optical inspection surface is maintained at the second temperature, wherein the second sheet has a thermal conductivity that is at least one order of magnitude lower than a thermal conductivity of the first sheet such that heating of the fluid by the generation of the thermal flow across the optical inspection surface is limited or avoided, and wherein the second sheet has a thickness determined by $$H_{lid} > \left(\frac{T_{dp} - T_0 - \Delta T_{max}}{\Delta T_{max}}\right)\left(\frac{\sigma_{lid}}{\sigma_{buf}}\right)H_c$$

where $H_{lid}$ is the thickness of the second sheet, $T_{dp}$ is the temperature of condensation of ambient humidity contained in the air which surrounds the optical inspection surface, $T_o$ is an operating temperature desired inside the microchamber, $\Delta T_{max}$ is the maximum increase in temperature tolerable inside the microchamber relative to a target operating temperature, $\sigma_{lid}$ is the thermal conductivity of the second sheet, $\sigma_{buf}$ is a thermal conductivity of the fluid to be contained in the microchamber, and $H_c$ is a thickness of the microchamber as measured by the distance between the interior surfaces of the first and second sheets, wherein $\Delta T_{max} = (T_{buf} - T_o)_{max}$ and $T_{buf}$ is the temperature of the fluid.

2. The method of claim 1, wherein the first temperature is about 3° C. to about 6° C.

3. The method of claim 1, further comprising continuously measuring the temperature of the optical inspection surface while performing the optical inspection of the particles and adjusting the thermal flow across the optical inspection surface based on the measurement to maintain the optical inspection surface at the second temperature during the optical inspection.

4. The method of claim 1, wherein the interior surface of the second sheet is at or substantially near the first temperature during optical inspection of the particles in suspension.

5. The method of claim 1, wherein optical inspection surface is heated by Joule effect by a resistor arranged on the optical inspection surface.

6. The method of claim 5, wherein the resistor is a transparent conductive resistive layer applied to the optical inspection surface or a plurality or filiform microresistors arranged on the optical inspection surface.

7. An apparatus for optical analysis of particles contained in suspension in a fluid, comprising:

a microchamber comprising an internal volume delimited by interior surfaces of oppositely disposed first and second sheets, the internal volume being adapted to contain the particles contained in suspension in the fluid, the first and second sheets defining bottom and top surfaces of the microchamber, an exterior surface of the second sheet defining an optical inspection surface through which the particles can be optically inspected;

a cooling device thermally coupled with the first sheet and being adapted to cool the fluid when contained in the internal volume of the microchamber to a first temperature and maintain the fluid at the first temperature during optical inspection;

a thermal flow generator arranged to generate a thermal flow across the optical inspection surface to heat the optical inspection surface to a second temperature and maintain the optical inspection surface at the second temperature during operation of the apparatus for optical inspection of the particles in suspension; and an optical inspection device for optical analysis of the particles in suspension in the internal volume, the optical inspection device arranged to optically view the particles through the second sheet, wherein:

the first temperature is below ambient temperature, the second temperature is higher than a temperature of condensation of ambient humidity contained in the air which surrounds the optical inspection surface, the first sheet has a thermal conductivity that is at least one order of magnitude higher than the second sheet, and the second sheet has a thickness determined by $$H_{lid} > \left(\frac{T_{dp} - T_0 - \Delta T_{max}}{\Delta T_{max}}\right)\left(\frac{\sigma_{lid}}{\sigma_{buf}}\right)H_c$$

where $H_{lid}$ is the thickness of the second sheet, $T_{dp}$ is the temperature of condensation of ambient humidity contained in the air which surrounds the optical inspection surface, $T_o$ is an operating temperature desired inside the microchamber, $\Delta T_{max}$ is the maximum increase in temperature tolerable inside the microchamber relative to a target operating temperature, $\sigma_{lid}$ is the thermal conductivity of the second sheet, $\sigma_{buf}$ is a thermal conductivity of the fluid to be contained in the microchamber, and $H_c$ is a thickness of the microchamber as measured by the distance between the interior surfaces of the first and second sheets, wherein $\Delta T_{max} = (T_{buf} - T_o)_{max}$ and $T_{buf}$ is the temperature of the fluid.

8. The apparatus of claim 7, further comprising a thermal sensor operatively connected to the thermal flow generator, the thermal sensor adapted to constantly measure the temperature of the optical inspection surface and provide feedback to the thermal flow generator for adjusting the thermal flow to maintain the optical inspection surface at the second temperature during optical analysis.

* * * * *